United States Patent
Agrawal

(10) Patent No.: US 10,334,029 B2
(45) Date of Patent: Jun. 25, 2019

(54) FORMING NEIGHBORHOOD GROUPS FROM DISPERSE CLOUD PROVIDERS

(71) Applicant: Cisco Technology, Inc., San Jose, CA (US)

(72) Inventor: Mohit Agrawal, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 101 days.

(21) Appl. No.: 15/403,074

(22) Filed: Jan. 10, 2017

(65) Prior Publication Data

US 2018/0198852 A1  Jul. 12, 2018

(51) Int. Cl.
*G06F 9/50* (2006.01)
*H04L 29/08* (2006.01)
*H04W 4/08* (2009.01)

(52) U.S. Cl.
CPC ........ *H04L 67/1002* (2013.01); *G06F 9/5072* (2013.01); *H04L 67/10* (2013.01); *H04W 4/08* (2013.01)

(58) Field of Classification Search
CPC . H04L 67/1042; H04L 67/1044; H04L 67/10; H04L 41/0806; H04L 63/0218; H04L 63/0263; H04L 63/1441; H04L 63/20; H04L 45/02; H04L 45/127; H04L 45/42; H04L 45/48; H04W 4/08; H04W 4/02; H04W 12/02; H04W 40/22; H04W 4/70; H04H 20/59; Y02D 70/144; H05B 33/0854
See application file for complete search history.

(56) References Cited

U.S. PATENT DOCUMENTS

| | | | |
|---|---|---|---|
| 5,812,773 A | 9/1998 | Norin | |
| 5,889,896 A | 3/1999 | Meshinsky et al. | |
| 6,108,782 A | 8/2000 | Fletcher et al. | |
| 6,178,453 B1 | 1/2001 | Mattaway et al. | |

(Continued)

FOREIGN PATENT DOCUMENTS

| | | |
|---|---|---|
| CN | 101719930 | 6/2010 |
| CN | 101394360 | 7/2011 |

(Continued)

OTHER PUBLICATIONS

Vilata et al., An efficient approach to external cluster assessment with an application to martian topography, Feb. 2007, Data Mining and Knowledge Discovery 14.1: 1-23. New York: Springer Science & Business Media.*

(Continued)

*Primary Examiner* — Ninos Donabed
(74) *Attorney, Agent, or Firm* — Polsinelli PC

(57) ABSTRACT

A cloud manager, for forming neighborhood groups from disperse cloud providers, receives provider data relating to a plurality of disperse cloud providers for a plurality of data subcategories classified under N-number main categories. The cloud manager generates a respective vector to represent each of the plurality of disperse cloud providers based on the provider data. The cloud manager generates an N-number axis space comprising the vectors. The cloud manager groups the plurality of disperse cloud providers in the N-number axis space into at least one cloud provider group, based on the vectors and a clustering algorithm.

13 Claims, 6 Drawing Sheets

(56) References Cited

U.S. PATENT DOCUMENTS

| | | |
|---|---|---|
| 6,298,153 B1 | 10/2001 | Oishi |
| 6,343,290 B1 | 1/2002 | Cossins et al. |
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,885,670 B1 | 4/2005 | Regula |
| 6,996,615 B1 | 2/2006 | McGuire |
| 7,054,930 B1 | 5/2006 | Cheriton |
| 7,058,706 B1 | 6/2006 | Lyer et al. |
| 7,062,571 B1 | 6/2006 | Dale et al. |
| 7,076,397 B2 | 7/2006 | Ding et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,606,147 B2 | 10/2009 | Luft et al. |
| 7,647,594 B2 | 1/2010 | Togawa |
| 7,684,322 B2 | 3/2010 | Sand et al. |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,284,776 B2 | 10/2012 | Petersen |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B1 | 5/2013 | Donnellan et al. |
| 8,477,610 B2 | 7/2013 | Zuo et al. |
| 8,495,252 B2 | 7/2013 | Lais et al. |
| 8,495,356 B2 | 7/2013 | Ashok et al. |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andries et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,182 B1 | 9/2014 | Fritz et al. |
| 8,856,339 B2 | 10/2014 | Mestery et al. |
| 8,909,780 B1 | 12/2014 | Dickinson et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,104,334 B2 | 8/2015 | Madhusudana et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,313,048 B2 | 4/2016 | Chang et al. |
| 9,361,192 B2 | 6/2016 | Smith et al. |
| 9,380,075 B2 | 6/2016 | He et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,613,078 B2 | 4/2017 | Vermeulen et al. |
| 9,628,471 B1 | 4/2017 | Sundaram et al. |
| 9,632,858 B2 | 4/2017 | Sasturkar et al. |
| 9,658,876 B2 | 5/2017 | Chang et al. |
| 9,692,802 B2 | 6/2017 | Bicket et al. |
| 9,727,359 B2 | 8/2017 | Tsirkin |
| 9,736,063 B2 | 8/2017 | Wan et al. |
| 9,755,858 B2 | 9/2017 | Bagepalli et al. |
| 9,792,245 B2 | 10/2017 | Raghavan et al. |
| 9,804,988 B1 | 10/2017 | Ayoub et al. |
| 9,954,783 B1 | 4/2018 | Thirumurthi et al. |
| 2002/0004900 A1 | 1/2002 | Patel |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0095237 A1 | 5/2004 | Chen et al. |
| 2004/0131059 A1 | 7/2004 | Ayyakad et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0059558 A1 | 3/2006 | Selep et al. |
| 2006/0104286 A1 | 5/2006 | Cheriton |
| 2006/0120575 A1* | 6/2006 | Ahn ............... G06K 9/00006 382/124 |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0294207 A1 | 12/2006 | Barsness et al. |
| 2007/0011330 A1 | 1/2007 | Dinker et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0010277 A1 | 1/2009 | Halbraich et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |

(56) References Cited

U.S. PATENT DOCUMENTS

| | | |
|---|---|---|
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0217886 A1 | 8/2010 | Seren et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325257 A1 | 12/2010 | Goel et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0199902 A1 | 8/2011 | Leavy et al. |
| 2011/0213687 A1 | 9/2011 | Ferris et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1* | 9/2011 | Pulier .................. G06F 9/45558 726/1 |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0023418 A1 | 1/2012 | Frields et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0131176 A1* | 5/2012 | Ferris .................. G06F 9/5072 709/224 |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0166649 A1 | 6/2012 | Watanabe et al. |
| 2012/0167094 A1 | 6/2012 | Suit |
| 2012/0173541 A1 | 7/2012 | Venkatarannani |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185632 A1 | 7/2012 | Lais et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0203908 A1 | 8/2012 | Beaty et al. |
| 2012/0204169 A1 | 8/2012 | Breiter et al. |
| 2012/0204187 A1 | 8/2012 | Breiter et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0303618 A1 | 11/2012 | Dutta et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0069950 A1 | 3/2013 | Adam et al. |
| 2013/0080509 A1 | 3/2013 | Wang |
| 2013/0080624 A1 | 3/2013 | Nagai et al. |
| 2013/0091282 A1* | 4/2013 | Tontiruttananon .... G06F 9/5061 709/226 |
| 2013/0091557 A1 | 4/2013 | Gurrapu |
| 2013/0097601 A1 | 4/2013 | Podvratnik et al. |
| 2013/0103702 A1* | 4/2013 | Solheim ............ G06F 17/30622 707/755 |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185413 A1 | 7/2013 | Beaty et al. |
| 2013/0185433 A1 | 7/2013 | Zhu et al. |
| 2013/0191106 A1 | 7/2013 | Kephart et al. |
| 2013/0198050 A1 | 8/2013 | Shroff et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0232492 A1 | 9/2013 | Wang |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0254680 A1* | 9/2013 | Buhr ...................... A63F 13/12 715/753 |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |

(56) References Cited

U.S. PATENT DOCUMENTS

| | | |
|---|---|---|
| 2014/0006535 A1 | 1/2014 | Reddy |
| 2014/0006585 A1 | 1/2014 | Dunbar et al. |
| 2014/0019639 A1 | 1/2014 | Ueno |
| 2014/0040473 A1 | 2/2014 | Ho et al. |
| 2014/0040883 A1 | 2/2014 | Tompkins |
| 2014/0052877 A1 | 2/2014 | Mao |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0129703 A1* | 5/2014 | Patel .............. G06Q 30/0625 709/224 |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0160924 A1 | 6/2014 | Pfautz et al. |
| 2014/0164486 A1 | 6/2014 | Ravichandran et al. |
| 2014/0173112 A1* | 6/2014 | Seago .................. H04L 67/32 709/226 |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0269266 A1 | 9/2014 | Filsfils et al. |
| 2014/0280805 A1 | 9/2014 | Sawalha |
| 2014/0280961 A1* | 9/2014 | Martinez ............ H04L 41/5054 709/226 |
| 2014/0282536 A1 | 9/2014 | Dave et al. |
| 2014/0282611 A1 | 9/2014 | Campbell et al. |
| 2014/0282669 A1 | 9/2014 | McMillan |
| 2014/0282889 A1 | 9/2014 | Ishaya et al. |
| 2014/0289200 A1 | 9/2014 | Kato |
| 2014/0297569 A1 | 10/2014 | Clark et al. |
| 2014/0297835 A1 | 10/2014 | Buys |
| 2014/0314078 A1 | 10/2014 | Jilani |
| 2014/0317261 A1 | 10/2014 | Shatzkamer et al. |
| 2014/0366155 A1 | 12/2014 | Chang et al. |
| 2014/0372567 A1 | 12/2014 | Ganesh et al. |
| 2015/0006470 A1 | 1/2015 | Mohan |
| 2015/0033086 A1 | 1/2015 | Sasturkar et al. |
| 2015/0043335 A1 | 2/2015 | Testicioglu et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0058557 A1 | 2/2015 | Madhusudana et al. |
| 2015/0070516 A1 | 3/2015 | Shoemake et al. |
| 2015/0071285 A1 | 3/2015 | Kumar et al. |
| 2015/0089478 A1 | 3/2015 | Cheluvaraju et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0109923 A1 | 4/2015 | Hwang |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0149828 A1 | 5/2015 | Mukerji et al. |
| 2015/0178133 A1 | 6/2015 | Phelan et al. |
| 2015/0200903 A1* | 7/2015 | Fujita .................. H04L 51/32 709/206 |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0271199 A1 | 9/2015 | Bradley et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0288569 A1 | 10/2015 | Agarwal et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0370791 A1* | 12/2015 | Solheim ............ G06F 17/30622 707/706 |
| 2015/0373108 A1 | 12/2015 | Fleming et al. |
| 2015/0379062 A1 | 12/2015 | Vermeulen et al. |
| 2016/0011925 A1 | 1/2016 | Kulkarni et al. |
| 2016/0013990 A1 | 1/2016 | Kulkarni et al. |
| 2016/0062786 A1 | 3/2016 | Meng et al. |
| 2016/0065417 A1 | 3/2016 | Sapuram et al. |
| 2016/0080477 A1 | 3/2016 | Nedeltchev et al. |
| 2016/0094398 A1 | 3/2016 | Choudhury et al. |
| 2016/0094401 A1* | 3/2016 | Anwar ................ H04L 41/142 709/223 |
| 2016/0094410 A1* | 3/2016 | Anwar ............... H04L 67/1095 709/223 |
| 2016/0094480 A1 | 3/2016 | Kulkarni et al. |
| 2016/0094643 A1 | 3/2016 | Jain et al. |
| 2016/0094894 A1 | 3/2016 | Inayatullah et al. |
| 2016/0099847 A1 | 4/2016 | Melander et al. |
| 2016/0099873 A1 | 4/2016 | Gerö et al. |
| 2016/0103838 A1 | 4/2016 | Sainani et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0147676 A1 | 5/2016 | Cha et al. |
| 2016/0162436 A1 | 6/2016 | Raghavan et al. |
| 2016/0164914 A1 | 6/2016 | Madhav et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2016/0292611 A1 | 10/2016 | Boe et al. |
| 2016/0352682 A1 | 12/2016 | Chang |
| 2016/0359680 A1 | 12/2016 | Parandehgheibi et al. |
| 2016/0378389 A1 | 12/2016 | Hrischuk et al. |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0034199 A1 | 2/2017 | Zaw |
| 2017/0041342 A1 | 2/2017 | Efremov et al. |
| 2017/0054659 A1 | 2/2017 | Ergin et al. |
| 2017/0063674 A1 | 3/2017 | Maskalik et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0126583 A1* | 5/2017 | Xia ..................... H04L 43/0882 |
| 2017/0147297 A1 | 5/2017 | Krishnamurthy et al. |
| 2017/0163569 A1 | 6/2017 | Koganti |
| 2017/0171158 A1 | 6/2017 | Hoy et al. |
| 2017/0192823 A1 | 7/2017 | Karaje et al. |
| 2017/0264663 A1 | 9/2017 | Bicket et al. |
| 2017/0302521 A1 | 10/2017 | Lui et al. |
| 2017/0310556 A1 | 10/2017 | Knowles et al. |
| 2017/0317932 A1 | 11/2017 | Paramasivam |
| 2017/0339070 A1 | 11/2017 | Chang et al. |
| 2018/0069885 A1 | 3/2018 | Patterson et al. |
| 2018/0173372 A1 | 6/2018 | Greenspan et al. |
| 2018/0174060 A1 | 6/2018 | Velez-Rojas et al. |

FOREIGN PATENT DOCUMENTS

| | | |
|---|---|---|
| CN | 102164091 | 8/2011 |
| CN | 104320342 | 1/2015 |
| CN | 105740084 A | 7/2016 |
| EP | 2228719 | 9/2010 |
| EP | 2439637 | 4/2012 |
| EP | 2645253 | 11/2014 |
| KR | 20150070676 A | 6/2015 |

(56) References Cited

FOREIGN PATENT DOCUMENTS

| TW | M394537 | 12/2010 |
|---|---|---|
| WO | WO 2009/155574 | 12/2009 |
| WO | WO 2010/030915 | 3/2010 |
| WO | WO 2013/158707 | 10/2013 |

OTHER PUBLICATIONS

S. H. Al-Harbi et al., Adapting k-means for supervised clustering, Jun. 2006, Applied Intelligence, vol. 24, Issue 3, pp. 219-226.*
Extended European Search Report from the European Patent Office, dated May 24, 2018, 10 pages, for the corresponding European Patent Application No. 18150277.4.
Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Beyer, Steffen, "Module "Data::Locations?!"," YAPC::Europe, London, UK,ICA, Sep. 22-24, 2000, XP002742700, 15 pages.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technolocw/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.
Amedro, Brian, et al., "An Efficient Framework for Running Applications on Clusters, Grids and Cloud," 2010, 17 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Use Cases and Interactions for Managing Clouds, A White Paper from the Open Cloud Standards Incubator," Version 1.0.0, Document No. DSP-IS00103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.

(56) References Cited

OTHER PUBLICATIONS

Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Kunz, Thomas, et al., "OmniCloud—The Secure and Flexible Use of Cloud Storage Services," 2014, 30 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Ye, Xianglong, et al., "A Novel Blocks Placement Strategy for Hadoop," 2012 IEEE/ACTS 11$^{th}$ International Conference on Computer and Information Science, 2012 IEEE, 5 pages.
Bohner, Shawn A., "Extending Software Change Impact Analysis into COTS Components," 2003, IEEE, 8 pages.
Hood, C. S., et al., "Automated Proactive Anomaly Detection," 1997, Springer Science and Business Media Dordrecht, pp. 688-699.

\* cited by examiner

FORMING NEIGHBORHOOD GROUPS FROM DISPERSE CLOUD PROVIDERS

BACKGROUND OF THE INVENTION

Field of the Invention

The disclosed technology relates to delivery of computing as a service. In particular, example embodiments relate to partitioning and operating a portion of computing resources not traditionally used in a cloud fashion as resources available as a service.

Description of the Related Art

Traditional data centers tend to run a single operating system instance and a single business application on one physical server. This "one server, one appliance" model leads to extremely poor resource utilization. Wasted resources include CPU, RAM, Storage, and Network Bandwidth.

"Cloud computing" refers to a model for enabling ubiquitous, convenient, on-demand network access to a shared pool of configurable computing resources (e.g., networks, servers, storage, applications, and services) that may be rapidly provisioned and released with minimal management effort or service provider interaction. The cloud computing model is characterized by on-demand self-service, broad network access, resource pooling, rapid elasticity, and measured service. Cloud computing service models include software as a service (SaaS), platform as a service (PaaS), and infrastructure as a service (IaaS). Cloud computing deployment models include public clouds, private clouds, community clouds, and hybrid combinations thereof. The cloud model can allow end users to reduce capital expenditures and burdensome operating costs associated with maintaining substantial information technology expertise and operating staff in house.

Typical cloud computing and storage solutions provide users and enterprises with various capabilities to store and process their data in third-party data centers that may be located far from the user—ranging in distance from across a city to across the world. Cloud computing relies on sharing of resources to achieve coherence and economy of scale, similar to a utility (like the electricity grid) over an electricity network.

BRIEF DESCRIPTION OF THE DRAWINGS

These and other sample aspects of the present technology will be described in the detailed description and the appended claims that follow, and in the accompanying drawings, wherein:

BRIEF INTRODUCTION

Figure 1:
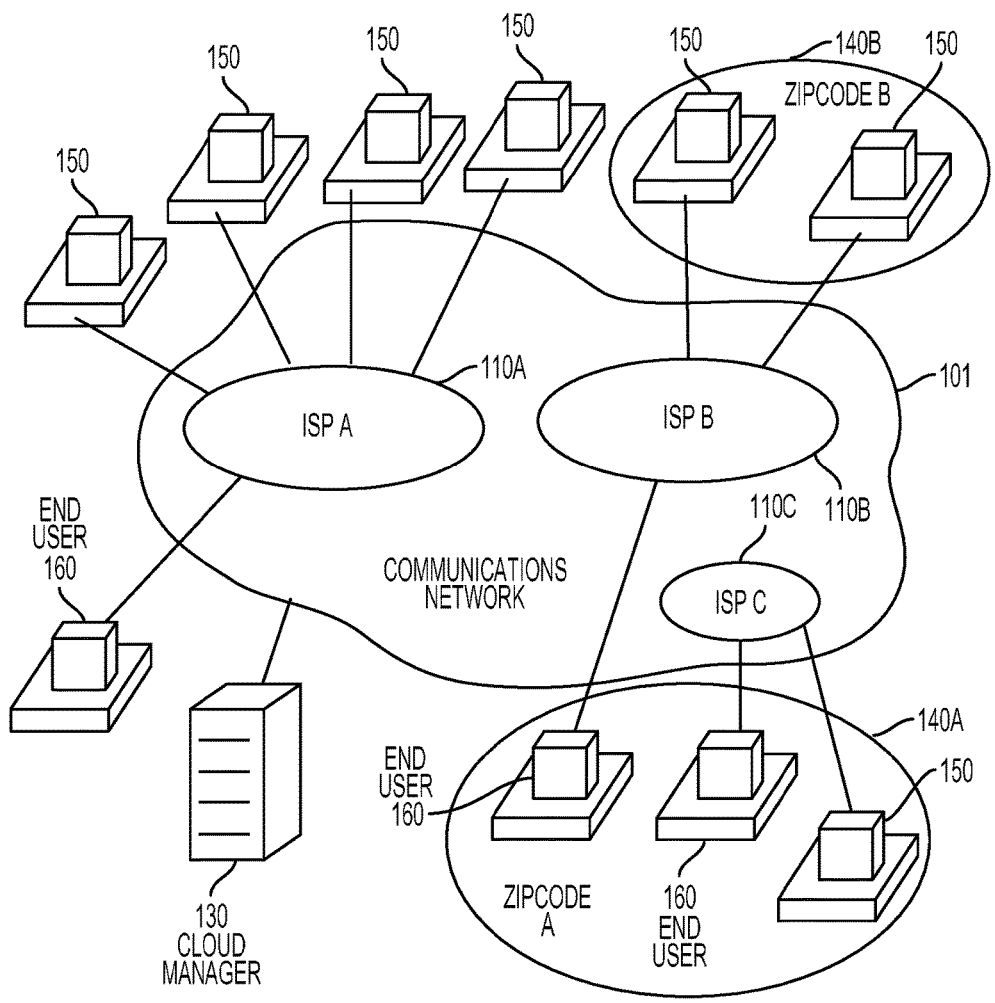
FIG. 1 illustrates a block diagram of an example network topology for forming neighborhood groups from disperse cloud providers.

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later. In accordance with one or more aspects of the examples described herein, systems and methods are provided for tracking usage of distributed software for virtual machines.

The subject disclosure provides systems and methods for forming neighborhood groups from disperse cloud providers. A cloud manager receives provider data relating to a plurality of disperse cloud providers for a plurality of data subcategories classified under N-number main categories. The cloud manager generates a respective vector to represent each of the plurality of disperse cloud providers based on the provider data to yield vectors. The cloud manager generates an N-number axis space comprising the vectors. The cloud manager groups the plurality of disperse cloud providers in the N-number axis space into at least one cloud provider group, based on the vectors and a clustering algorithm.

DETAILED DESCRIPTION

The subject disclosure provides techniques for forming neighborhood groups from disperse cloud providers, in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

The power of traditional end user environments is exploding. Some estimate that the compute power of the equivalent of a personal computer, such as found in the typical home environment, in 2049 may be equal to all computing power created through 2012. Further, the ability of home environments to offer services and products (south-to-north, south-to-west, and south-to-east traffic) may expand. This is similar to how some people offer home-generated electrical power to public utilities. This trend opens the door for "utility computing," where the consumer can share the excess of his home cloud or IT infrastructure with peers, Internet Service Providers (ISPs), application providers, or third parties. This capability effectively may transform the consumer of goods and services into a market resident who owns a home infrastructure and allocates part of it to create a cloud and offer services and products to peers, ISPs, application providers, or third parties. In some embodiments, it allows customers to become entrepreneurs and de-facto application providers and/or crowd-sourced public cloud providers.

Similar to cloud computing, fog computing can provide data, compute, storage, and application services to end-users. Fog computing or fog networking, is an architecture that uses one or more collaborative multitude of end-user clients or near-user edge devices to carry out a substantial amount of storage (rather than stored primarily in cloud data centers), communication (rather than routed over the internet backbone), control, configuration, measurement and management (rather than controlled primarily by network gateways such as those in the LTE core network).

Computing resources of each of a plurality of first parties, such as residential subscribers to an Internet Service Provider (ISP), can be logically partitioned into a first party end user partition and a first party crowd sourced cloud partition. Home, businesses, schools, and universities, could all participate in a crowd sourced cloud as providers of services, capacity, or both. These entities can provide one or more devices or appliances (i.e., "computing resources") that can provide compute, network, or storage capacity in a context of space, power, and cooling.

In example architectures for the technology, while each server, system, and device shown in the architecture is represented by one instance of the server, system, or device, multiple instances of each can be used. Further, while certain aspects of operation of the technology are presented in examples related to the figures to facilitate enablement of the disclosed concepts, additional features of the technology, also facilitating enablement of the concepts, are disclosed elsewhere herein.

The subject disclosure provides a cloud manager that receives provider data for multiple disperse cloud providers. The cloud manager analyzes the provider data and groups the disperse cloud providers into one or more cloud provider groups. By placing certain cloud providers together into particular cloud provider groups, the cloud providers can pool computing resources more effectively to better serve cloud end users.

Given that many of the disperse cloud providers are expected to be from home environments, the end-user apps can be based upon a micro-services application architecture. In the micro-services application architecture, applications can be moved to another home-cloud infrastructure without impacting consumer experience. Micro-service architecture is a method of developing software applications as a suite of independently deployable, small, modular services in which each service runs a unique process and communicates through a well-defined, lightweight mechanism.

FIG. 1 illustrates a block diagram of an example network topology 100 for forming neighborhood groups from disperse cloud providers 150. The example network topology 100 shows an example arrangement of various network elements of a network 101. It should be noted that the example network topology 100 is merely an example arrangement for demonstration and does not describe all possible types of network configurations for use with the claimed invention.

The network 101 can include a wide area network (WAN) such as the Internet, or a local area network (LAN). The network 101 can include an intranet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

A cloud manager 130, diverse cloud providers 150, and cloud end users 160 are connected to the network 101. For example, if the network 101 is the Internet, the diverse cloud providers 150 and the cloud end users 160 can connect to the network 101 through one or more Internet Service Providers (ISPs) 110A-C. For example, ISPs 110A, 110B, 110C are shown in FIG. 1 for illustration. An ISP is an organization that provides services for accessing and using the Internet. Internet Service Providers may be organized in various forms, such as commercial, community-owned, non-profit, or otherwise privately owned. Internet services typically provided by ISPs include Internet access, Internet transit, domain name registration, web hosting, Usenet service, and colocation. Each ISP typically serves large groups of Internet users in a geographic area.

Figure 6:
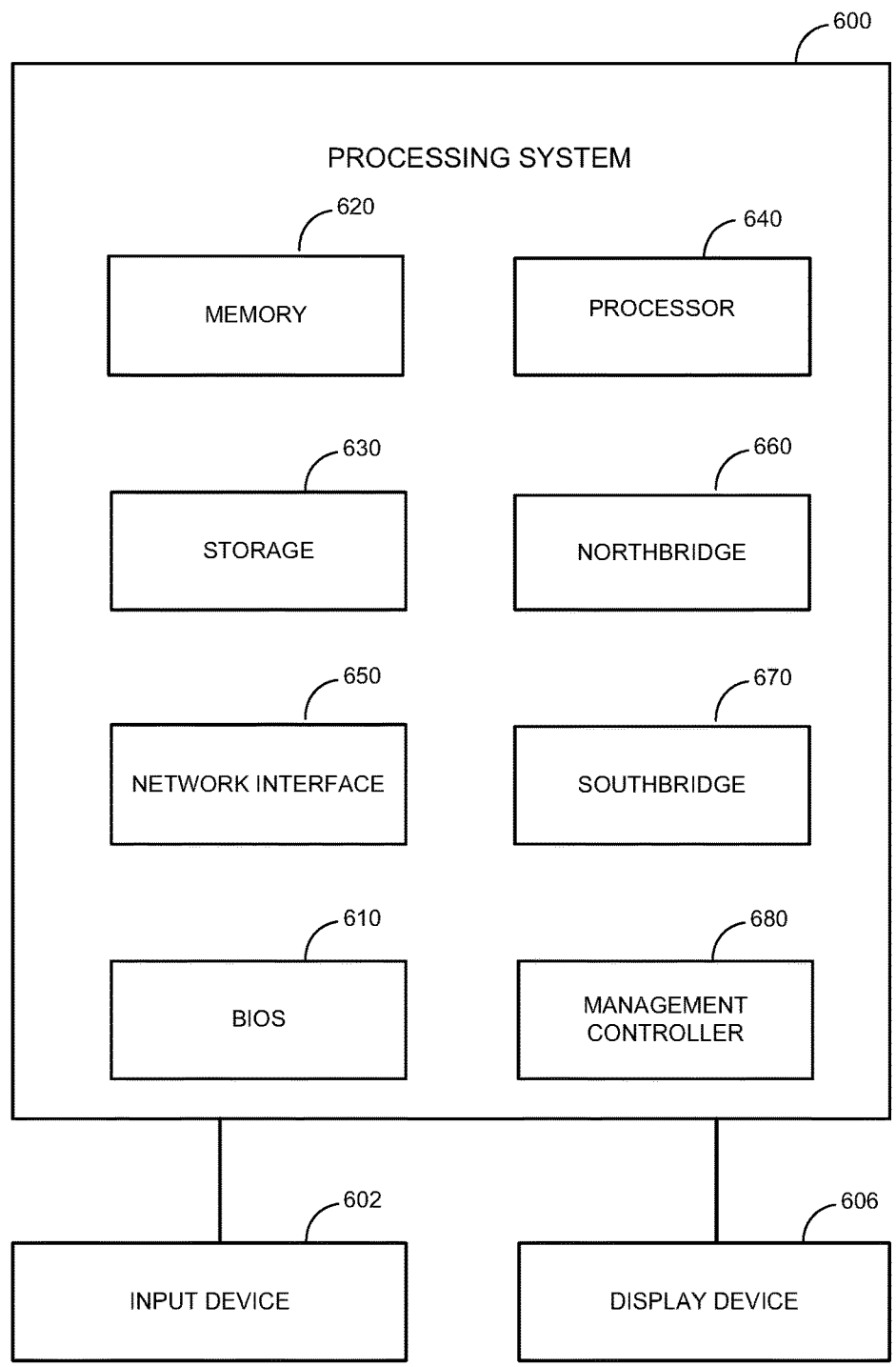
FIG. 6 illustrates a block diagram of an example computer system.

The network computing devices, such as the cloud manager 130, the diverse cloud providers 150, the cloud end users 160, and any other computing machines associated with the technology presented herein, may be any type of computing machine such as, but not limited to, those discussed in more detail with respect to FIG. 6. Furthermore, any functions, applications, or modules associated with any of these computing machines, such as those described herein or any others (for example scripts, web content, software, firmware, or hardware) associated with the technology presented herein may by any of the modules discussed in more detail with respect to FIG. 6. The computing machines discussed herein may communicate with one another as well as other computer machines or communication systems over one or more networks, such as network 101. The network 101 may include any type of data or communications network, including any of the network technology discussed with respect to FIG. 6.

The diverse cloud providers 150 can be located in various geographic locations. For example, one or more diverse cloud providers 150 may be located in each single zip code 140. For example, zip code 140A, zip code 140B, and zip code 140C are shown in FIG. 1 for illustration. It is possible, but not necessary for all diverse cloud providers 150 located in a single zip code 140B to also be serviced by a single ISP B110B. In contrast, diverse cloud providers 150 in zip code 140A are served by ISP 110B and 110C.

The cloud manager 130 can include any computing or processing device, such as for example, one or more computer servers. The cloud manager 130 can be a single device, multiple devices in one location, or multiple devices in multiple locations. In some implementations, the cloud manager 130 can be combined with or include the network computing devices for one or more of the diverse cloud providers 150 or the cloud end users 160.

Figure 2:
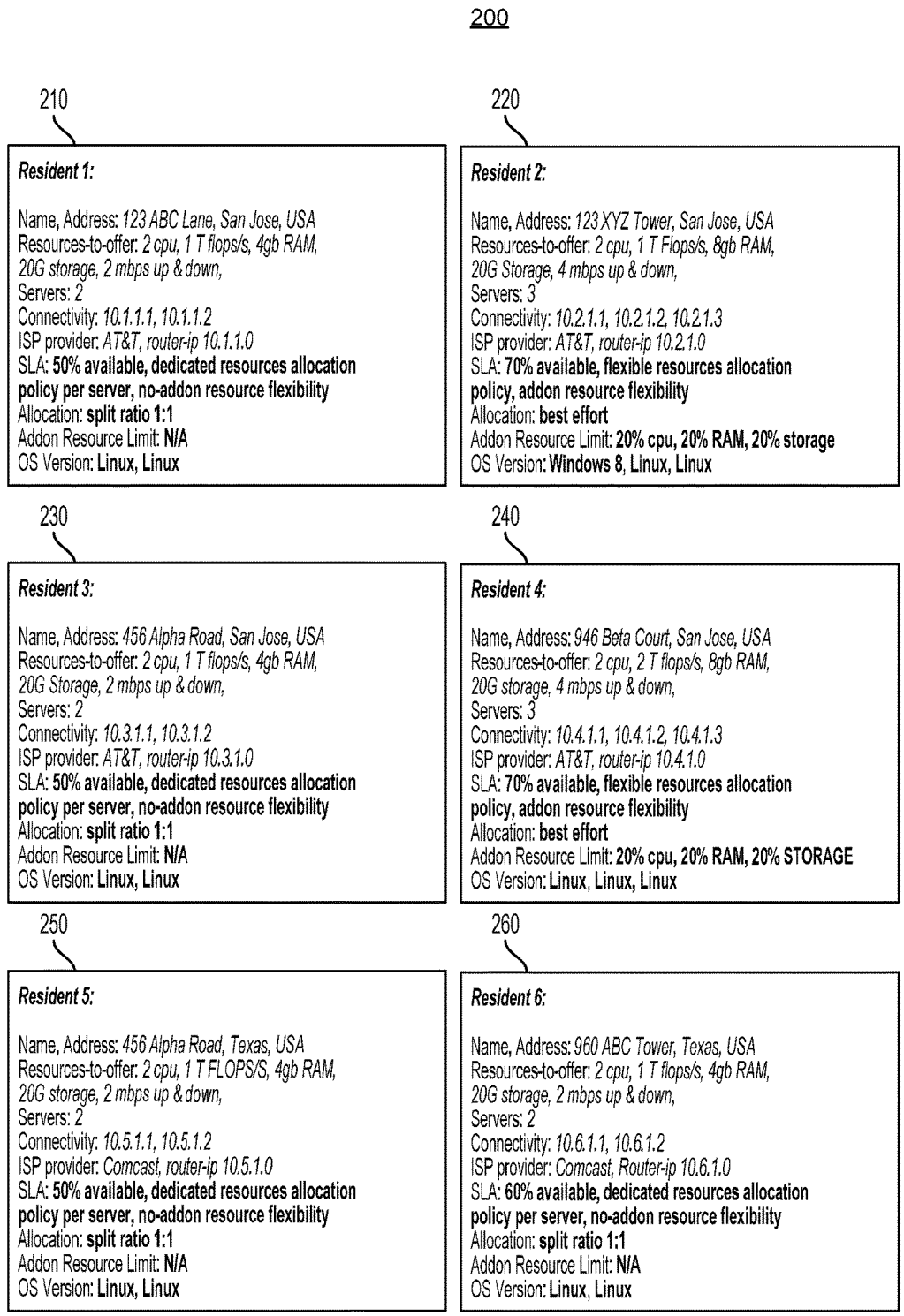
FIG. 2 illustrates provider data for example disperse cloud providers.

Each of the diverse cloud providers 150 can include one or more computing devices of various configurations. FIG. 2 describes in more detail example cloud provider configurations.

FIG. 2 illustrates provider data 200 for example disperse cloud providers 210-260. It should be noted that the example disperse cloud providers 210-260 are provided merely for demonstration and does not describe all possible types of computing device configurations for use with the claimed invention. The diverse cloud providers 210-260 may be any type of computing machine such as, but not limited to, those discussed in more detail with respect to FIG. 6. The diverse cloud providers 210-260 are each described by provider data in various categories, such as but not limited to, those described below.

Each disperse cloud provider 210-260 is located at particular a geographic address and offers a certain amount of computing resources to a cloud provider group. One or more physical computer servers can be located at the geographic address and include the computing resources offered.

The computing resources can be measured by any of a variety of performance metrics for system sources and computational resources. System resources include physical or virtual entities of limited availability (e.g., memory, processing capacity, and network speed). Computational resources include resources used for solving a computational problem (e.g., computation speed, memory space).

Computing resources, from one or more computer servers, can include, but are not limited to, CPUs, processing power—often measured in flops/second, memory such as random access memory (RAM), storage such as hard disk drives and/or solid state drives, and network connectivity—often measured in megabits/second (mbps) of data transmission speed and latency. The FLoating-point Operations Per Second (flops) is a measure of computer performance, useful in fields of scientific calculations that make heavy use of floating-point calculations.

Provider data for each disperse cloud provider 210-260 can include internet protocol (IP) addresses of the computer servers, internet service provider (ISP) identification and router IP address. An Internet Protocol address (IP address) is a numerical label assigned to each device (e.g., computer, printer) participating in a computer network that uses the Internet Protocol for communication. An IP address serves two principal functions: host or network interface identification and location addressing. Its role has been characterized as follows: "A name indicates what we seek. An address indicates where it is. A route indicates how to get there."

IP addresses were initially defined as a 32-bit number and this system, known as Internet Protocol Version 4 (IPv4), is still in use today. However, because of the growth of the Internet and the predicted depletion of available addresses, a new version of IP (IPv6), using 128 bits for the address, was developed in 1995.

Provider data for each disperse cloud provider 210-260 can include the type of service level agreements (SLAs). The SLA is an official commitment that prevails between a service provider and the customer. Particular aspects of the service, such as quality, availability, responsibilities, are agreed between the service provider and the service user. The most common component of SLA is that the services should be provided to the customer as agreed upon in the contract. As an example, Internet service providers and telecommunications companies will commonly include SLAs within the terms of their contracts with customers to define the level(s) of service being sold in plain language terms. For example, the SLA will typically have a technical definition in terms of mean time between failures (MTBF), mean time to repair or mean time to recovery (MTTR) (i.e. identifying which party is responsible for reporting faults or paying fees), responsibility for various data rates, throughput, jitter, or similar measurable details.

Provider data for each disperse cloud provider 210-260 can include a resource allocation type. For example, the allocation type can be a split ratio 1:1 type or a best effort type of allocation. If the allocation type is the best effort type, then the provider data may include an addon resource limit for additional CPU, RAM, and/or storage use.

The provider data for each disperse cloud provider 210-260 can also include the types of software that each server is running, such as the operating system (OS) type and/or version, cloud software, etc.

The disperse cloud provider 210 represents Resident 1 located at 123 ABC Lane, San Jose, USA. The disperse cloud provider 210 offers two servers including a total of two central processing units (CPUs) and one teraflop/second (T-flops/s) of processing power. The disperse cloud provider 210 includes four gigabytes (gb) of RAM, 20 gb of storage, and two mbps of Internet connection speed. The disperse cloud provider 210 connects to the Internet with the ISP provider AT&T and has the IP address 10.1.1.1 for a first server and 10.1.1.2 for a second server.

The disperse cloud provider 210 has a SLA that provides for 50% availability of the computing resources on the two servers for cloud use. The SLA also provides a dedicated resources allocation policy per server. The disperse cloud provider 210 allocates resources into a split ratio 1:1 type with no addon resource flexibility. In addition, the two servers both run the Linux OS.

While not shown in FIG. 2, the provider data for the disperse cloud providers 210-260 can include data relating to: cost model, allocation model, percentage of SLAs met, user ratings, resources used, machine learning data for user usage patterns, and/or cloud size, etc. For example, the provider data for cost model can include a price per unit of storage or processing power that a disperse cloud provider will charge. The provider data for the allocation model can include whether addon resource for the disperse cloud provider is flexible or fixed. The provider data for the percentage of SLAs met can include data for the amount of compliance with SLAs. The provider data for the user ratings can include a user satisfaction score from one to ten. The provider data for the resources uses can include data for the total amount computing resources provided by the disperse cloud provider. The provider data for the cloud side can include whether the disperse cloud provider is a small, medium, or large provider (e.g, based on number of servers offered or amount of computing resources offered).

As shown in FIG. 2, the provider data for disperse cloud providers 220-260 provide similar information describing Residents 2-6.

Figure 3:
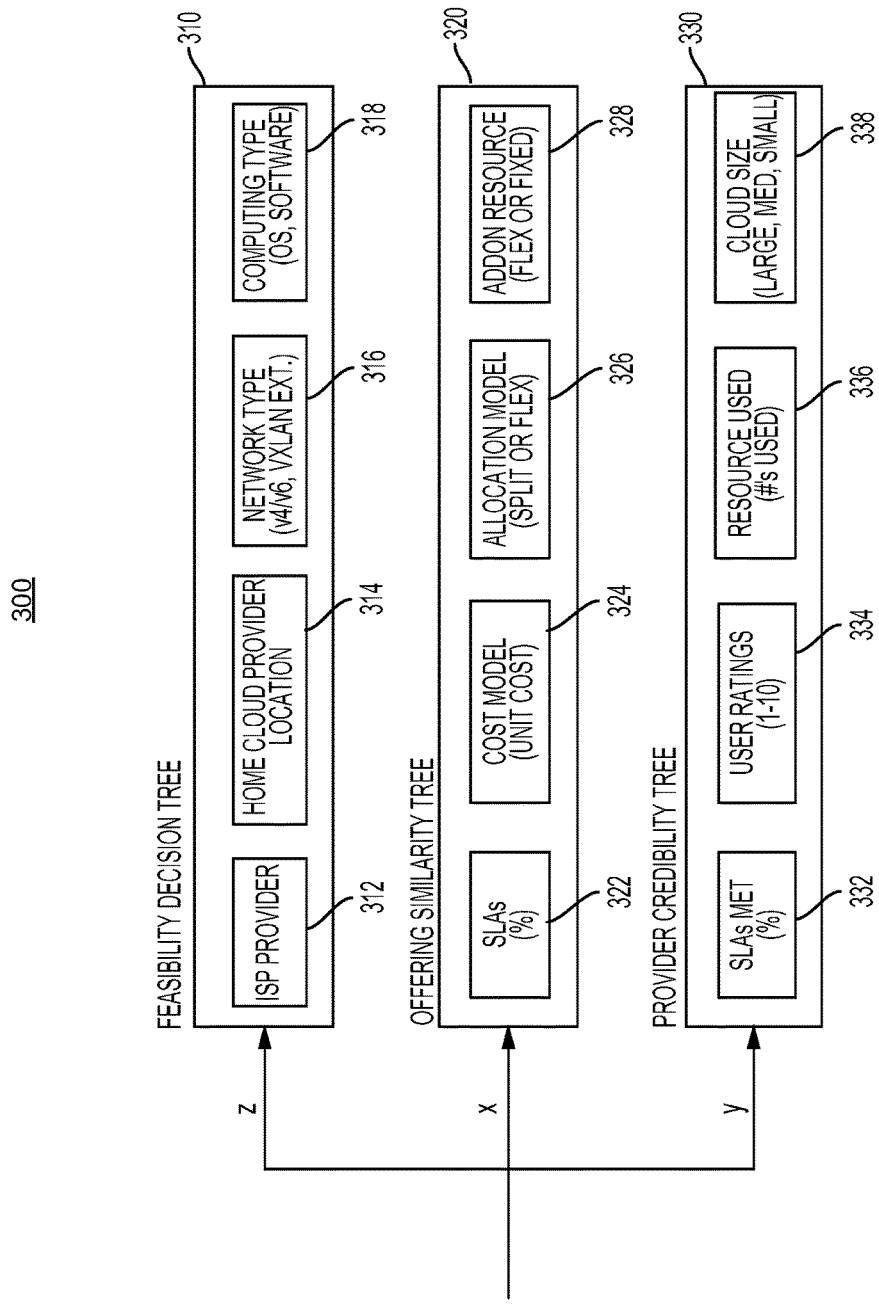
FIG. 3 illustrates an example characteristic scoring tree for generating vectors to represent disperse cloud providers.

FIG. 3 illustrates an example characteristic scoring tree 300 for generating vectors to represent disperse cloud providers. The provider data for a single disperse cloud provider, as described in the examples shown in FIG. 2, can be categorized under a number of main categories. In addition, the provider data can be further categorized under a number subcategories under the main categories. Each subcategory can be unique to one of the main categories or can exist under multiple main categories.

The example characteristic scoring tree 300 includes three main categories: feasibility (Z) 310, offering similarity (X) 320, and provider credibility (Y) 330. Each of the main categories includes four subcategories. For example, the feasibility (Z) main category 310 includes the subcategories: ISP provider 312, cloud provider location 314, network type 316, and computing type 318. The offering similarity main category 320 can include the subcategories: SLAs 322, cost model 324, allocation model 326, and addon resource 328. The provider credibility main category 330 can include the subcategories: percentage of SLAs met 332, user ratings 334, resources used 336, and cloud size 338. Even though the example characteristic scoring tree 300 shown in FIG. 3 includes three main categories, more or less than three main categories can be applied to the subject disclosure.

It should be noted that the characteristic scoring tree 300 is merely an example categorical arrangement for demonstration and does not describe all possible types of arrangements for use with the claimed invention.

In some implementations, the provider data for each subcategory is a numerical value. Each of the subcategories in a main category can be summed into a single numerical value to represent the X, Y, or Z. For example, numerical values for the ISP provider 312, the cloud provider location 314, the network type 316, and the computing type 318 can be summed into a value for the feasibility main category (Z) 310. Numerical values for the SLAs 322, the cost model 324, the allocation model 326, and the addon resource 328 can be summed into a value for the offering similarity main category (X) 320. Likewise, numerical values for the percentage of SLAs met 332, the user ratings 334, the resources used 336, and the cloud size 338 can be combined into a value for the provider credibility main category (Z) 330. Of course, the values in the trees are representative. Other values can also be used as well as any mixture of values or parameters.

The combination of the values of X, Y, and Z for the three main categories can be used to generate a three element vector such as (x, y, z) for the disperse cloud provider. In this manner, the cloud manager generates a three element vector for each of the respective disperse cloud providers. In some implementations, the number of elements in the generated vectors can match the number of main categories provided by the provider data. The vector can also include one element, two elements or more than three elements.

Figure 4:
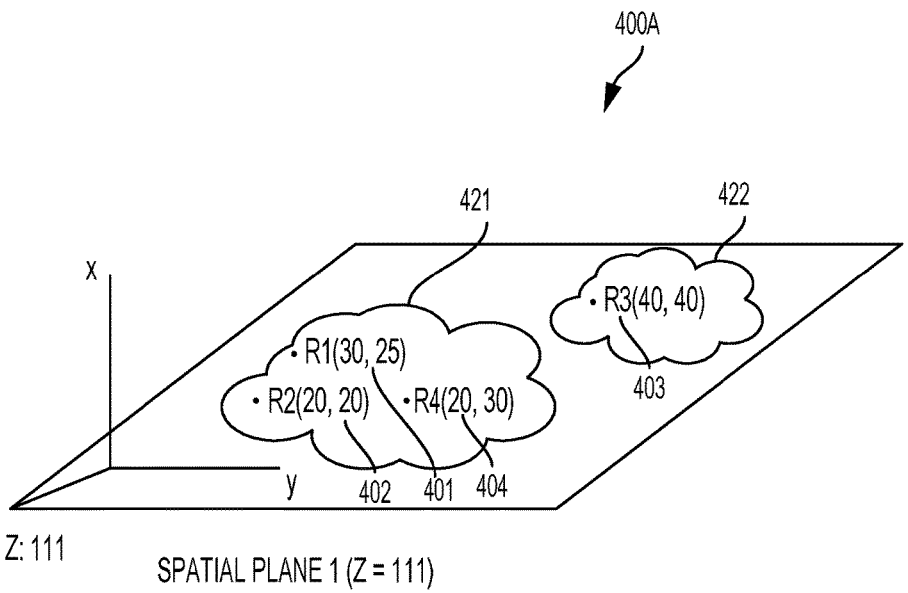
FIG. 4 illustrates an example three-axis space for grouping disperse cloud providers.

FIG. 4 illustrates an example three-axis space 400 for grouping disperse cloud providers 401-406. The space 400 has three-axis to match the number of elements in each vector for the disperse cloud providers 401-406. In other implementations, more (e.g., four or more) or less (e.g, one or two) axis spaces can be used. For example, if there are N-number of main categories and a corresponding N-number of elements in each vector, a N-number axis space is also used. Different coordinate systems besides a Cartesian coordinate system could be used as well.

The three-axis space 400 includes a respective vector corresponding to each disperse cloud provider 401-406. The cloud manager groups the disperse cloud providers together into different cloud groups, based on their vector values in the three-axis space.

FIG. 4 illustrates the three-axis space plane 1 400A to show only a first X-Y plane of the three-axis space 400 at a first Z value (e.g., Z=111 here). Similarly the three-axis space plane 2 400B illustrates only a second X-Y plane of the three-axis space 400 at a second Z value (e.g., Z=222 here). In some implementations, the cloud manager only groups together vectors on the same axis plane (e.g., the Z axis shown in FIG. 4). In some other implementations, the cloud manager does not require vectors in the same cloud group to be on any single plane. Even though FIG. 4 shows a three-axis space, one-axis, two-axis, or four or more axis can also be applied to the subject disclosure. In other implementations, more (e.g., four or more) or less (e.g, one or two) axis spaces can be used. Different coordinate systems besides a Cartesian coordinate system could be used as well.

In some implementations, the cloud manager uses a clustering algorithm to group the vectors for the disperse cloud providers into different cloud groups. For example, the cloud manager can use a KMeans clustering algorithm. However, KMeans is only one of many possible clustering algorithms for use by the cloud manager.

KMeans clustering is a method of vector quantization, originally from signal processing, that is popular for cluster analysis in data mining. KMeans clustering aims to partition n observations into k clusters in which each observation belongs to the cluster with the nearest mean, serving as a prototype of the cluster. This results in a partitioning of the data space into Voronoi cells.

A Voronoi diagram is a partitioning of a plane into regions based on distance to points in a specific subset of the plane. That set of points (called seeds, sites, or generators) is specified beforehand, and for each seed there is a corresponding region consisting of all points closer to that seed than to any other. These regions are called Voronoi cells.

The most common KMeans algorithm uses an iterative refinement technique. Given an initial set of observations, the KMeans algorithm proceeds by alternating between two steps, an assignment step and an update step. In the assignment step, assign each observation to the cluster whose mean yields the least within-cluster sum of squares (WCSS). Since the sum of squares is the squared Euclidean distance, this is intuitively the "nearest" mean. In the update step, calculate the new means to be the centroids of the observations in the new clusters. The algorithm has converged when the assignments no longer change. Since both steps optimize the WCSS objective, and there only exists a finite number of such partitioning, the algorithm must converge to a local optimum. The algorithm is often presented as assigning objects to the nearest cluster by distance. The standard algorithm aims at minimizing the WCSS objective, and thus assigns by "least sum of squares", which is exactly equivalent to assigning by the smallest Euclidean distance.

In some implementations, the clustering algorithm is a suggested and supervised KMeans (SS-KMeans) clustering algorithm, and where each grouping of one of the plurality of disperse cloud providers reinforces the SS-KMeans clustering algorithm.

FIG. 4 illustrates an example KMeans clustering algorithm applied to a six vectors 401-406 corresponding to six respective disperse cloud providers. The vectors 401-406 are each possessed sequentially. The vectors can be processed in any order based on any number of factors.

The cloud manger plots R1 401 with vector (30, 25, 111) on plane 1 400A. Since R1 401 is first, R1 401 is placed into cloud group (i.e., "cluster") 421. The cloud manager plots R2 with vector (20, 20, 111) on plane 1 400A. Since the cloud group 421 is the only available cluster, R2 will get the cloud group 421 as a "suggested" grouping to choose from. The cloud manager places R2 402 with R1 401 into the cloud group 421. When R2 402 joins R1 401 in the cloud group 421, this is called supervised clustering. When a disperse cloud provider joins an existing cloud group, the training set of the supervised clustering is reinforced. The cloud manager generates a KMeans value for R1 401 and R2 402 in cloud group 421.

The cloud manager plots R3 403 (40, 40, 111) on plane 1 400A. Since plane 1 400A has one cluster 421 including R1 401 and R2 402, R3 403 will get a "suggested" grouping based on a mean proximity of cluster 421 to R3. In this case, R3 403 selects to be in separate cluster 422. Now there are two clusters or cloud groups (i.e., k=2). One KMean is based on cluster 421 including R1 401 and R2 402 and the other Kmean is based just based on cluster 422 including R3 403.

The cloud manager plots R4 (20, 30, 111) 404 on plane 1 400A. Now plane 1 has two clusters 421, 422. R4 404 selects to be part of cluster 421. The total number of clusters remains at two. Cluster 421 receives a new KMean. Now cluster 421 includes R1 401, R2 402, and R4 404 and cluster 422 includes R3 403.

In the example shown in FIG. 4, a separate KMeans is applied to plane 2 400B. The cloud manager plots R5 (30, 30, 222) 405 on plane 2 400B, since vector R5 405 has a Z value of 222. Vector R5 405 is placed into cluster 424. The cloud manager plots R6 (30, 40, 222) 406 to plan 2 400B. R6 406 is placed into cluster 425.

Figure 5:
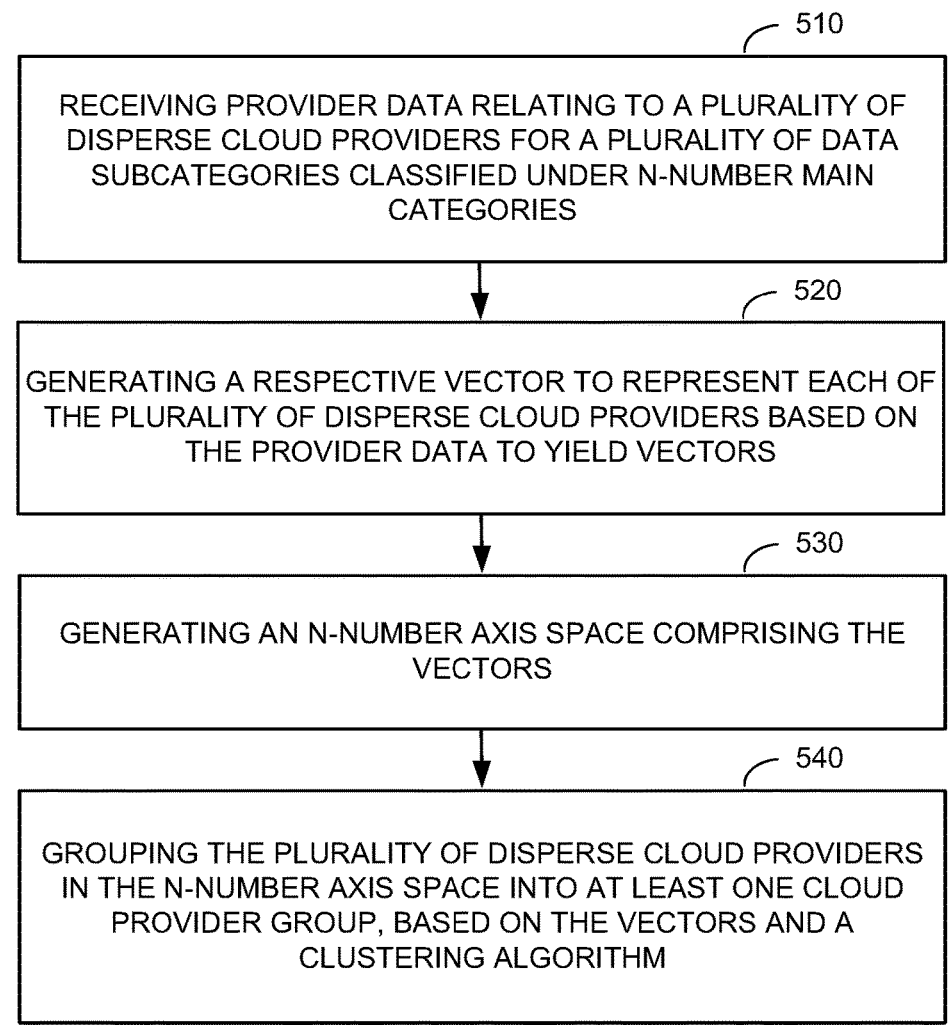
FIG. 5 illustrates an example methodology for tracking usage of virtual machines.

FIG. 5 illustrates an example methodology 500 for tracking usage of virtual machines. At step 510, the cloud manager receives provider data relating to a plurality of disperse cloud providers for a plurality of data subcategories classified under N-number main categories.

In some implementations, the cloud manager determines a respective numerical value to represent each of the plurality of data subcategories for each of the plurality of disperse cloud providers. The N-number main categories can include at least one of a feasibility decision score, offering similarity score, or provider credibility score. The plurality of data subcategories can include at least one of internet service provider, provider location, network type, computing type, service level agreement (SLA), cost model, allocation model, resource flexibility, percentage SLA met, user ratings, resource used, or cloud size.

At step 520, the cloud manager generates a respective vector to represent each of the plurality of disperse cloud providers based on the provider data to yield vectors. Each respective element of the vector can be based on the provider data for one of the N-number main categories.

At step 530, the cloud manager generates an N-number axis space including the vectors.

At step 540, the cloud manager groups the plurality of disperse cloud providers in the N-number axis space into at least one cloud provider group, based on the vectors and a clustering algorithm.

In some implementations, grouping the plurality of disperse cloud providers includes grouping each respective vector in the N-number axis space into one of the at least one cloud provider group, based on the clustering algorithm. The clustering algorithm can be a KMeans clustering algorithm that groups the data points in the N-number axis space into k-number clusters.

In some implementations, the clustering algorithm is a suggested and supervised KMeans (SS-KMeans) clustering algorithm, and where each grouping of one of the plurality of disperse cloud providers reinforces the SS-KMeans clustering algorithm. The clustering algorithm can be an agglomerative hierarchical clustering algorithm or a divisive hierarchical clustering algorithm.

In some implementations, the cloud manager monitors for a change in the provider data for a disperse cloud provider. When there is a change in the provider data for a disperse cloud provider, the cloud manager generates an updated vector for the disperse cloud provider, and regroups the disperse cloud provider.

FIG. 6 illustrates a block diagram of an example processing system 600. The processing system 600 can include a processor 640, a network interface 650, a management controller 680, a memory 620, a storage 630, a Basic Input/Output System (BIOS) 610, and a northbridge 660, and a southbridge 670.

The processing system 600 can be, for example, a server (e.g., one of many rack servers in a data center) or a personal computer. The processor (e.g., central processing unit (CPU)) 640 can be a chip on a motherboard that can retrieve and execute programming instructions stored in the memory 620. The processor 640 can be a single CPU with a single processing core, a single CPU with multiple processing cores, or multiple CPUs. One or more buses (not shown) can transmit instructions and application data between various computer components such as the processor 640, memory 620, storage 630, and networking interface 650.

The memory 620 can include any physical device used to temporarily or permanently store data or programs, such as various forms of random-access memory (RAM). The storage 630 can include any physical device for non-volatile data storage such as a HDD or a flash drive. The storage 630 can have a greater capacity than the memory 620 and can be more economical per unit of storage, but can also have slower transfer rates.

The BIOS 610 can include a Basic Input/Output System or its successors or equivalents, such as an Extensible Firmware Interface (EFI) or Unified Extensible Firmware Interface (UEFI). The BIOS 610 can include a BIOS chip located on a motherboard of the processing system 600 storing a BIOS software program. The BIOS 610 can store firmware executed when the computer system is first powered on along with a set of configurations specified for the BIOS 610. The BIOS firmware and BIOS configurations can be stored in a non-volatile memory (e.g., NVRAM) 612 or a ROM such as flash memory. Flash memory is a non-volatile computer storage medium that can be electronically erased and reprogrammed.

The BIOS 610 can be loaded and executed as a sequence program each time the processing system 600 is started. The BIOS 610 can recognize, initialize, and test hardware present in a given computing system based on the set of configurations. The BIOS 610 can perform self-test, such as a Power-on-Self-Test (POST), on the processing system 600. This self-test can test functionality of various hardware components such as hard disk drives, optical reading devices, cooling devices, memory modules, expansion cards and the like. The BIOS can address and allocate an area in the memory 620 in to store an operating system. The BIOS 610 can then give control of the computer system to the OS.

The BIOS 610 of the processing system 600 can include a BIOS configuration that defines how the BIOS 610 controls various hardware components in the processing system 600. The BIOS configuration can determine the order in which the various hardware components in the processing system 600 are started. The BIOS 610 can provide an interface (e.g., BIOS setup utility) that allows a variety of different parameters to be set, which can be different from parameters in a BIOS default configuration. For example, a user (e.g., an administrator) can use the BIOS 610 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 680 can be a specialized microcontroller embedded on the motherboard of the computer system. For example, the management controller 680 can be a BMC or a RMC. The management controller 680 can manage the interface between system management software and platform hardware. Different types of sensors built into the computer system can report to the management controller 680 on parameters such as temperature, cooling fan speeds, power status, operating system status, etc. The management controller 680 can monitor the sensors and have the ability to send alerts to an administrator via the network interface 650 if any of the parameters do not stay within preset limits, indicating a potential failure of the system. The administrator can also remotely communicate with the management controller 680 to take some corrective action such as resetting or power cycling the system to restore functionality.

The northbridge 660 can be a chip on the motherboard that can be directly connected to the processor 640 or can be integrated into the processor 640. In some instances, the northbridge 660 and the southbridge 670 can be combined into a single die. The northbridge 660 and the southbridge 670, manage communications between the processor 640 and other parts of the motherboard. The northbridge 660 can manage tasks that require higher performance than the southbridge 670. The northbridge 660 can manage communications between the processor 640, the memory 620, and video controllers (not shown). In some instances, the northbridge 660 can include a video controller.

The southbridge 670 can be a chip on the motherboard connected to the northbridge 660, but unlike the northbridge 660, is not directly connected to the processor 640. The southbridge 670 can manage input/output functions (e.g., audio functions, BIOS, Universal Serial Bus (USB), Serial Advanced Technology Attachment (SATA), Peripheral Component Interconnect (PCI) bus, PCI eXtended (PCI-X) bus, PCI Express bus, Industry Standard Architecture (ISA) bus, Serial Peripheral Interface (SPI) bus, Enhanced Serial Peripheral Interface (eSPI) bus, System Management Bus (SMBus), etc.) of the processing system 600. The southbridge 670 can be connected to or can include within the southbridge 670 the management controller 670, Direct Memory Access (DMAs) controllers, Programmable Interrupt Controllers (PICs), and a real-time clock.

The input device 602 can be at least one of a game controller, a joystick, a mouse, a keyboard, a touchscreen, a trackpad, or other similar control device. The input device 602 allows a user to provide input data to the processing system 600.

The display device 604 can be at least one of a monitor, a light-emitting display (LED) screen, a liquid crystal display (LCD) screen, a head mounted display (HMD), a virtual reality (VR) display, a augmented reality (AR) display, or other such output device. The display device 604 allows the processing system 600 to output visual information to a user.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. A method for forming neighborhood groups from disperse cloud providers, by a cloud manager, the method comprising:
   receiving provider data relating to a plurality of disperse cloud providers for a plurality of data subcategories classified under N-number main categories including at least:
      a feasibility category with corresponding data subcategories of ISP provider, cloud provider location, network type and computing type;
      an offering similarity category with corresponding data subcategories of service level agreement ("SLA"), cost model, allocation model, and addon resource; and
      provider credibility with corresponding data subcategories of percentage of SLAs met, user ratings, resources used, and cloud size;
   scoring the feasibility category, offering similarity category and provider credibility category to produce a feasibility score, offering similarity score and provider credibility score;
   generating a respective vector to represent each of the plurality of disperse cloud providers based on the provider data to yield vectors, each respective vector including as an element of the vector the feasibility score, the offering similarity sore and the provider credibility score of the respective cloud provider;

generating an N-number axis space comprising the vectors; and grouping the plurality of disperse cloud providers in the N-number axis space into at least one cloud provider group, based on the vectors and a clustering algorithm wherein the clustering algorithm is a suggested and supervised KMeans (SS-KMeans) clustering algorithm;

providing access to the one cloud provider group such that resources within the one cloud provider group are collectively available for use.

2. A method of claim 1, wherein each respective element of the respective vector is based on the provider data for one of the N-number main categories.

3. A method of claim 1, wherein grouping the plurality of disperse cloud providers comprises grouping each respective vector in the N-number axis space into one of the at least one cloud provider group, based on the clustering algorithm.

4. The method of claim 1, further comprising monitoring for a change in the provider data for a disperse cloud provider.

5. The method of claim 4, further comprising in response to the change in the provider data for a disperse cloud provider, generating an updated vector for the disperse cloud provider, and regrouping the disperse cloud provider.

6. The method of claim 1, wherein each grouping of one of the plurality of disperse cloud providers reinforces the SS-KMeans clustering algorithm.

7. The method of claim 1, wherein grouping first separates the data points on a single plane of the N-number axis space representing a corresponding main category, before applying the clustering algorithm.

8. A cloud manager device for forming neighborhood groups from disperse cloud providers, the cloud manager device comprising:

at least one processor; and a memory coupled to the at least one processor, the memory storing instructions which, when executed by the at least one processor, cause the at least one processor to perform operations comprising:

receiving provider data relating to a plurality of disperse cloud providers for a plurality of data subcategories classified under N-number main categories including at least:

a feasibility category with corresponding data subcategories of ISP provider, cloud provider location, network type and computing type;

an offering similarity category with corresponding data subcategories of service level agreement ("SLA"), cost model, allocation model, and addon resource; and provider credibility with corresponding data subcategories of percentage of SLAs met, user ratings, resources used, and cloud size;

scoring the feasibility category, offering similarity category and provider credibility category to produce a feasibility score, offering similarity score and provider credibility score;

generating a respective vector to represent each of the plurality of disperse cloud providers based on the provider data to yield vectors, each respective vector including as an element of the vector the feasibility score, the offering similarity sore and the provider credibility score of the respective cloud provider;

generating an N-number axis space comprising the vectors; and grouping the plurality of disperse cloud providers in the N-number axis space into at least one cloud provider group, based on the vectors and a clustering algorithm wherein the clustering algorithm is a suggested and supervised KMeans (SS-KMeans) clustering algorithm;

providing access to the one cloud provider group such that resources within the one cloud provider group are collectively available for use.

9. A cloud manager device of claim 8, wherein each respective element of the respective vector is based on the provider data for one of the N-number main categories.

10. A claim device of claim 8, wherein grouping the plurality of disperse cloud providers comprises grouping each respective vector in the N-number axis space into one of the at least one cloud provider group, based on the clustering algorithm.

11. A cloud manager device of claim 8, wherein the KMeans clustering algorithm groups the data points in the N-number axis space into k-number clusters.

12. A cloud manager device of claim 8, wherein grouping first separates the data points on a single place of the N-number axis space representing a corresponding main category before applying the clustering algorithm.

13. A non-transient computer readable storage device storing program instructions which, when executed by a processor, cause the processor to perform operations comprising:

receiving provider data relating to a plurality of disperse cloud providers for a plurality of data subcategories classified under N-number main categories including at least:

a feasibility category with corresponding data subcategories of ISP provider, cloud provider location, network type and computing type;

an offering similarity category with corresponding data subcategories of service level agreement ("SLA"), cost model, allocation model, and addon resource; and provider credibility with corresponding data subcategories of percentage of SLAs met, user ratings, resources used, and cloud size;

scoring the feasibility category, offering similarity category and provider credibility category to produce a feasibility score, offering similarity score and provider credibility score;

generating a respective vector to represent each of the plurality of disperse cloud providers based on the provider data to yield vectors, each respective vector including as an element of the vector the feasibility score, the offering similarity sore and the provider credibility score of the respective cloud provider;

generating an N-number axis space comprising the vectors; and grouping the plurality of disperse cloud providers in the N-number axis space into at least one cloud provider group, based on the vectors and a clustering algorithm wherein the clustering algorithm is a suggested and supervised KMeans (SS-KMeans) clustering algorithm;

providing access to the one cloud provider group such that resources within the one cloud provider group are collectively available for use.

\* \* \* \* \*